INVENTORS
PAUL M. THRASHER
CARL D. AVERS

BY [signature]

United States Patent Office 3,519,747

Patented July 7, 1970

3,519,747

SIGNAL INSERTION AND CONFERENCING IN A RESONANT TRANSFER INTEGRATED TIME DIVISION SWITCHING AND FREQUENCY DIVISION MULTIPLEXING COMMUNICATION SYSTEM

Carl D. Avers, Rockville, and Paul M. Thrasher, Bethesda, Md., assignors to International Business Machines Corporation, Armonk, N.Y., a corporation of New York Filed Sept. 15, 1967, Ser. No. 667,966
Int. Cl. H04j 3/02
U.S. Cl. 179—15 8 Claims

ABSTRACT OF THE DISCLOSURE

An integrated time division switching and frequency division multiplexing communication system employing an essentially lossless resonant transfer tone insertion scheme in the distribution system, with the added capability of effecting a conferencing connection by time multiplexing signals from the input lines or channels included in the conference into one conferencing wideband low pass filter on the output side of the system and, after passing the combined signal into a second wideband filter, multiplexing to the output lines or channels included in the conference.

The invention herein described was made in the course of or under a contract with the Department of the Air Force.

The present invention is related to copending application Ser. No. 372,874 filed June 5, 1964 by P. O. Dahlman and P. M. Thrasher and assigned to the present assignee, and also to copending application Ser. No. 591,316 filed Nov. 1, 1966 to P. M. Thrasher and R. J. Ward and also assigned to the present assignee. The former of the two copending applications relates to an integrated time division switching and frequency division multiplexing communication system utilizing resonant transfer between filters of equal bandwith. The latter of the above copending applications relates to a communication system employing resonant transfer between filters of unequal bandwith.

The present invention relates to tone or signal insertion in an integrated time division switching and frequency division multiplexing communication system similar to the system disclosed in the former application. An added conferencing capability allows any or all talkers in a conference arrangement to be simultaneously heard by all listeners in a conference. This capability is achieved through the utilization of the above-mentioned signal insertion scheme employing resonant transfer between filters of unequal bandwith.

BACKGROUND OF THE INVENTION

The invention relates to the field of tone or signal insertion in communication systems. In particular, it relates to a signal insertion technique for injecting supervisory signals into a system or for achieving a conferencing communication connection allowing any or all talkers in a conference arrangement to be simultaneously heard by all listeners in the conference. Conferencing communication systems have been known in the prior art. However prior art communication systems suffer from the disadvantages of being expensive in hardware, and also of sustaining signal loss through the distribution system.

Accordingly, it is an object of this invention to overcome the disadvantages of prior art communication systems.

It is another object of this invention to effect a resonant transfer supervisory tone or signal insertion in a communication system, with operating characteristics equal to or better than those of the prior art systems, but with the added advantages of being ideally lossless and comparatively less expensive in hardware.

It is a further object of this invention to utilize said signal insertion to effect a resonant transfer conferencing communication system of a type heretofore unknown in the prior art.

SUMMARY OF THE INVENTION

Briefly, the invention comprises the insertion of signals into an integrated time division switching and frequency division and multiplexing system without upsetting the operation of the system itself. This is accomplished by utilizing a signal insertion filter which is X times the bandwith of the other filters in the system, where X is defined as the number of time slots available. Thus, the signal insertion filter is able to feed any one or all of the output filters of an integrated time division switching and frequency division multiplexing system without upsetting the normal operation of the system. Utilizing this scheme, a conferencing system can be achieved by time division multiplexing the input side of the lines to be included in a conference hookup into one conferencing wideband low pass filter on the output side of the system, and, after passing the combined signal into a second wideband filter, multiplexing to the output side of the integrated time division switching and frequency division multiplexing communication system.

The foregoing and other objects, features and advantages of the invention will be apparent from the following more particular description of a preferred embodiment of the invention, as illustrated in the accompanying drawings.

RESONANT TRANSFER BETWEEN FILTERS OF UNEQUAL BANDWIDTH

Figure 1:
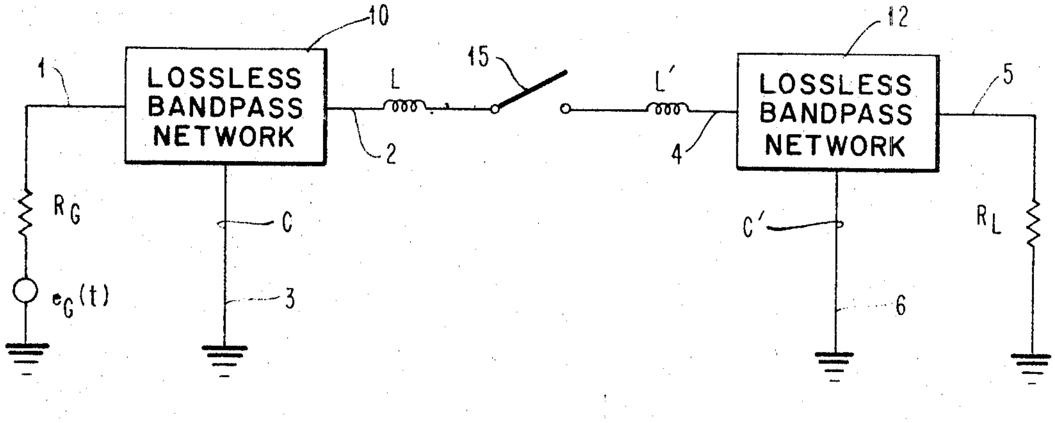
FIG. 1 is a representation of the basic resonant transfer circuit utilized in the invention.

FIG. 1 shows a representation of the basic circuit for resonant transfer between filters of unequal bandwidth, which is employed in the present invention. This present circuit has been thoroughly described and analyzed in the above-referenced copending patent application 591,396 and reference is made to that application for detailed operation of the circuit. However, certain points about the circuit will be described here for background information. As seen in FIG. 1, the resonant transfer circuit utilized in the invention comprises an input filter 10, a sampling gate 15, and an output filter 12. Each filter may be a different bandwidth from the other. Each filter is designated as bandpass in FIG. 1, but either may be bandpass or low pass. A source of signal $e_G(t)$ having resistance $R_G$ is connected to input 1, which is the input of filter 10. Output 2 of the input filter is connected via inductor L to one side of sampling switch 15. The other side of the sampling switch is connected via inductor L′ to the input 4 of output filter 12. The output 5 of the output filter is connected to a load resistance $R_L$. Sampling switch 15 is periodically operated at a sampling frequency $f_s$. As explained in copending application Ser. No. 591,316, certain design considerations exist for the filters of the resonant transfer switching circuit. In particular, the bandwidth and passband of each filter must be such that:

$$\left.\begin{array}{l} W=mf_s/2 \\ \text{High edge of passband}=nmf_s/2 \end{array}\right] \qquad (1)$$

where W is the bandwidth of the filter, and where $m$ and $n$ are integral positive numbers.

In Equation 1, the choice of $n$ places the filter along the frequency axis, and the choice of $m$ sets its bandwidth. For example, for $n=1$ and $m=1$ the filter is a low pass filter having a bandwidth of $f_s/2$ c.p.s., from zero to $f_s/2$ c.p.s. If $n$ is equal to 1 the filter is low pass. If $n$ is greater than 1, the filter is bandpass.

It can be shown that the above restrictions on the bandwidth and placement of the filters insure that the proper initial conditions are met. That is, when the filters are connected in a resonant transfer mode of operation, as in FIG. 1, the voltage at the input of the output filter will always be passing through zero at sampling instance $1/mf_s$, $2/mf_s$ . . . and the voltage at the output of the input filter will always be at the level of the input voltage at the sampling instants. Furthermore, the impedances should be such that:

$$Z_{45}(j\omega)=\left[\begin{array}{ll} R_{1e}^{-j\omega t_0} & \text{within the band} \\ 0 & \text{elsewhere} \end{array}\right. \qquad (2)$$

where $Z_{45}(j\omega)=E_5(j\omega)/I_4(j\omega)$, and $t_0$ is the filter phase shift constant. Further, $$Z_{21}(j\omega)=\left[\begin{array}{ll} R_g e^{-j\omega t_0} & \text{within the band} \\ 0 & \text{elsewhere} \end{array}\right. \qquad (3)$$

where: $Z_{21}(j\omega)=E_1(j\omega)/I_2(j\omega)$.

C may or may not equal C′, and likewise $R_G$ may or may not equal $R_L$. For ideally lossless resonant transfer between the filters $MR_G$ should equal $M'R_L$ where M is the value of $m$ for the input filter and M′ is the value of $m$ for the output filter. It can be shown, however, that if $MR_G$ differs somewhat from $M'R_L$, the loss in the amount of energy transferred is not dramatic so that the adjustment of $MR_G$ to equal $M'R_L$ is not highly critical.

In operation, the energy storage means of each filter is initially completely discharged. An incoming information signal from signal source $e_G(t)$ passes from the input 1 to the output 2 of the input filter 10. The signal is sampled by switch 15 at a rate $f_s$, thereby transferring a sample of the signal to the energy storage circuit of the output filter once during each sampling cycle $1/f_s$. During a sampling cycle switch 15 is held open until the incoming information signal charges the energy storage means in the input filter. At the precise instant that the energy storage means of the input filter becomes completely charged, the switch 15 is closed for a time $\tau$. During this time the energy storage means of the input filter discharges through the switch 15 and current flows in the resonant transfer circuit in the direction of the output filter. The energy storage circuit of the output filter then accepts the charge from the energy storage circuit of the input filter. Since, at the time of switch closure, the energy storage circuit in the input filter was completely charged, and the energy storage circuit in the output filter was completely discharged, the energy flow is completely unidirectional; i.e., from input side to output side. There is a complete and ideally lossless transfer of energy from the input filter having a first bandwidth to the output filter having a second bandwidth different from said first bandwidth. After the energy transfer has taken place, the switch is opened. The energy storage circuit in the input filter is now recharged while the energy storage circuit in the output filter discharges through some utilization circuit and the sampling cycle begins again. Thus, the incoming information signal is transferred directly from one filter to another of different bandwidth in an ideally lossless fashion.

DESCRIPTION OF SIGNAL INSERTION CIRCUIT

Figure 2:
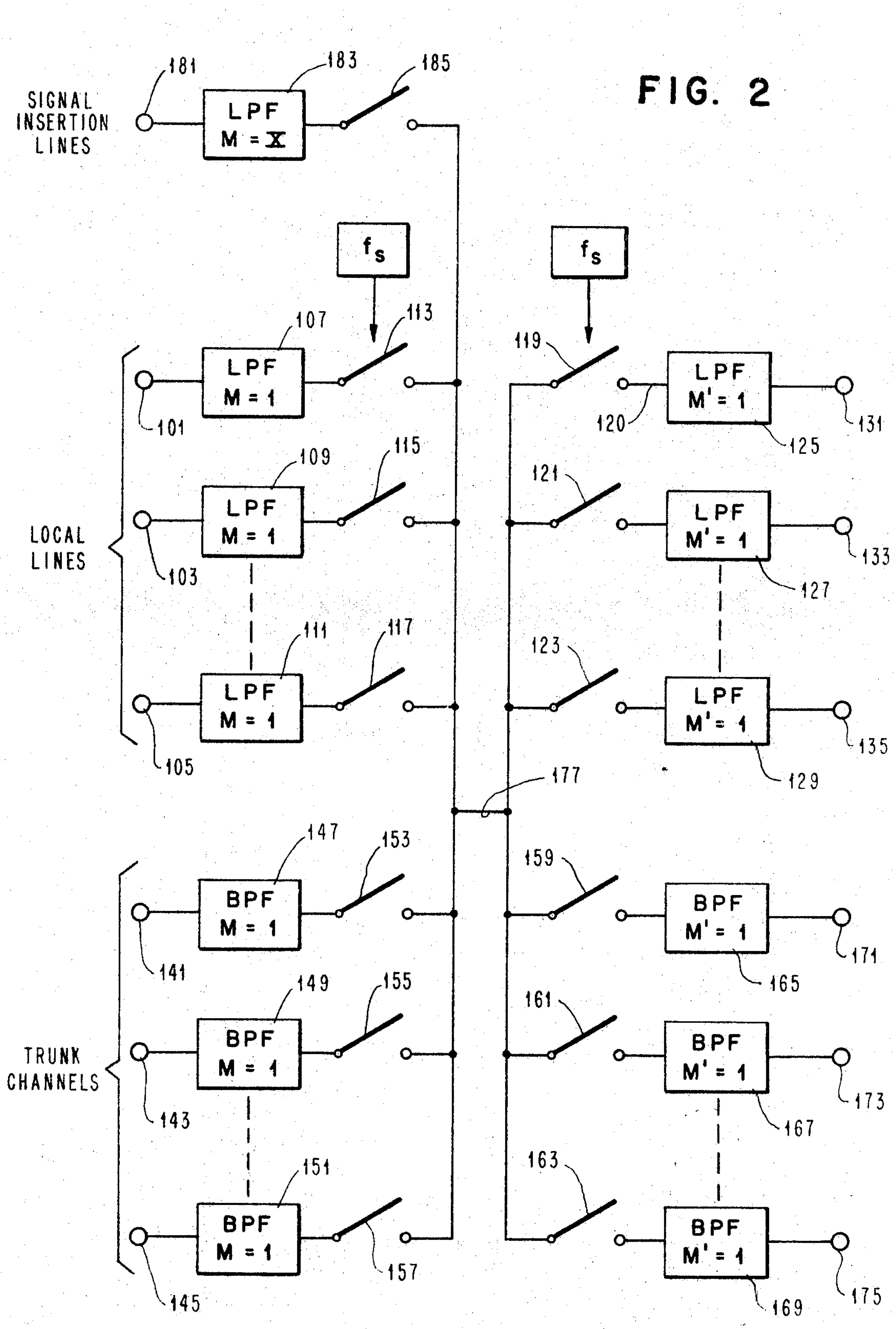
FIG. 2 is a representation of signal or tone insertion in an integrated time division switching frequency division multiplexing system.

Referring to FIG. 2, there is seen a circuit for supervisory signal or tone insertion in an integrated time division switching and frequency division multiplexing communication system. The basic communication system itself is seen comprising local lines in and out as well as trunk channels in and out. This basic communication system exclusive of the tone insertion scheme, has been disclosed in the above-referenced copending application Ser. No. 372,874. In a system of this type it is desirable to have the capability of supervisory signal insertion. One supervisory signalling scheme involves the insertion of a 2600 c.p.s. tone into all outgoing lines and channels. The presence or absence of this tone is used to convey information in accord with an established format. For the local lines it also performs certain control functions. In addition, specified combinations of other tones must be inserted into the outgoing lines to convey information such as busy or pre-input, or for addressing purposes on the trunk channels. All of these tones are in-band. For the purposes of illustrating this signalling insertion technique, consider that it is desired to insert a tone, such as the 2600 c.p.s. one, into any combination of the outgoing lines and channels. With reference to FIG. 2, local lines 101, 103, 105 are connected to input low pass filters 107, 109, 111. Each low pass filter is connected to the resonant transfer switch 113, 115, 117, the outputs of which are tied together to time divided highway 177. Input trunk channels 141, 143, 145 are connected to bandpass filters 147, 149, 151, respectively, which are connected, respectively, to resonant transfer switches 153, 155, 157. The output of these switches are also tied together to time divided highway 177. Proceeding to the output side, time divided highway 177 is connected to resonant transfer switches 119, 121, 123. Each switch is connected respectively to output low pass filter 125, 127, 129. Each of the last named filters are connected to output local lines 131, 133, 135, respectively. Time divided highway 177 is also connected to resonant transfer switches 159, 161, 163 which are connected respectively to output bandpass filters 165, 167, 169. Each of the last named bandpass filters are connected to output trunk channels 171, 173, 175. Tone insertion line 181 is also included in the system. Tone insertion line 181 is connected to wideband low pass filter 183 which is connected in turn to resonant transfer sampling switch 185. Sampling switch 185 is connected to time divided highway 177. Each of the input low pass filters 107, 109, 111 in the local line have $m$ set equal to 1 so that the bandwidth of each is from zero to $f_s/2$ cycles per second. Each of the output low pass filters 125, 127, 129 in the output local lines also have their $m$ set to 1. Since these filters are low pass, their value of $n$ is 1. Thus, they also have the same bandwidth and passbands as each of the filters on the input local lines. All sampling switches close at a rate of $f_s$ equal to 4 kcs., for the present example. Thus the line input and output signal sideband low pass filters extend from zero to 4 kcs. The trunk input and output single sideband bandpass filters would normally cover a range from 60 kcs. to 108 kcs. in 4 kcs. increments. Each bandpass filter has its $m$ equal to 1 so that the bandwidth of the input bandpass filters in the trunk channel can be designated for each filter as $[(N-1)f_s/2 \text{ to } Nf_s/2]$ and the bandwidth for the output bandpass filters can be designated as $[(N'-1)f_s/2 \text{ to } N'f_s/2]$. For the low pass filters, $N=N'=M=M'=1$, and for the bandpass channel filters $M=M'=1$ and N and N′ are integral numbers which would vary from 16 through 27 in order to cover the group frequency range 60 to 104 kcs. in 4 kcs. increments. Also each filter is assumed to be designed in accord with the design criteria Equations 1 through 3 and also $MR_G=M'R_L$. The input line and channel filters are each designed to be driven from a source of $R_G$ ohms. That is, the ideal impedance level within the band of the inputs is $R_G$. The output line and channel filters are each designed to operate into $R_L$ ohms. That is, the ideal impedance level within the bandwidth at the outputs is $R_L$. Since M and M' for all these filters is 1, to satisfy the requirement $MR_G=M'R_L$, $R_G$ must equal $R_L$. The bandwidth of the signal insertion filter 183 is X times that for the other filters of the system, where X is defined as the number of time slots available. In other words, M for filter 183 is set at X. This filter is to feed any one or all of the output lines on a time multiplexed basis, thus, the time multiplexing interval must be $1/Xf_s$. Stated in another way, the maximum sampling rate for the switch connected to this filter must be $Xf_s$. One frame time for the system is defined as $T=1/f_s$. During this frame time, filter 183 would have the capability of feeding all output lines and channels. The signal insertion switch could be closed during the time slot for all or any of the output lines as desired.

OPERATION OF SIGNAL INSERTION CIRCUIT

The basic switching capability for the system of FIG. 2 is from local line to local line, from local line to trunk channel, from trunk channel to local line, and from trunk channel to trunk channel. In all these cases, the basic transmission path is between 4 kcs. single sideband filters via a switch. Resonant transfer is incorporated. The output switches 119, 121, 123, 159, 161, 163 close in a fixed sequence of time slots at a rate of $f_s$. The input switches 113, 115, 117, 153, 155, 157, as well as the signal insertion switch 185 close in accord with the desired connection, by proper matching of time slots. The inputs of the trunk input filters and the outputs of the trunk output filters would be tied together. Whenever a trunk filter is involved in the switching process, frequency division multiplexing or demultiplexing occurs. By virtue of this integrated action, the outgoing trunk channels are multiplexed into one frequency division multiplex signal and the incoming frequency division multiplex signal is demultiplexed into separate channels. An example is as follows. An incoming message is received and distributed to an available incoming trunk 141, 143, 145. In order to switch one of the trunk channels, any one of filters 107, 109, 111, 147, 149, 153 on the input side of the switching circuit may be selectively interconnected on a time multiplexed basis to any one of the filters 125, 127, 129, 165, 167, 169. In order to insert a signalling tone into this network, said tone is applied to input 181 of filter 183 which is to feed any one or all of the output filters on a time multiplexed basisc. One frame time is defined as $T=1/f_s$. As mentioned above, due to the design consideration of the filters, the ringoff characteristic of each output filter, in response to an impulse will be passing through zero at intervals of $1/mf_s$, $2/mf_s$, $3/mf_s$ . . . , provided $m$ and $n$ are positive integral numbers. For the present example, $m$ and $n$ for the input and output filters respectively have been designated as one. For the signal insertion filter 183, $n$ has been designated as 1 and $m$ has been designated as X. Thus, during one frame, $T=1/f_s$, insertion filter 183 would have the capability of feeding all output lines and channels. The insertion switch 185 would be closed during the time slot for any or all of the output lines, depending upon which line or lines the signal is to be inserted into.

The transmission path for the inserted tone to get to any one output filter would be simply that of FIG. 1, with M for the input filter being X and M for the output filter being 1. The sampling rate with regard to any one output would be $f_s$. In the event that the insertion filter is feeding all X outputs, then all available power would be delivered. Successive equal increments of power would be drawn from the source as connection is made, by time slot matching, successively to various of the input lines and channels circuits 131, 133, 135, 171, 173, 175. The voltage level for any sampling instants at the input of any line or channel output filter such as, for example, 120 of filter 125, is the same as that which would be produced by inserting an equal voltage signal at a normal line input, for example, local line 101. It is this characteristic which allows tone signal insertion into the system without upsetting the balance of system operation.

DETAILED DESCRIPTION OF CONFERENCING SYSTEM EMPLOYING SIGNAL INSERTION INCORPORATING RESONANT TRANSFER BETWEEN FILTERS OF UNEQUAL BANDWIDTH

Figure 3:
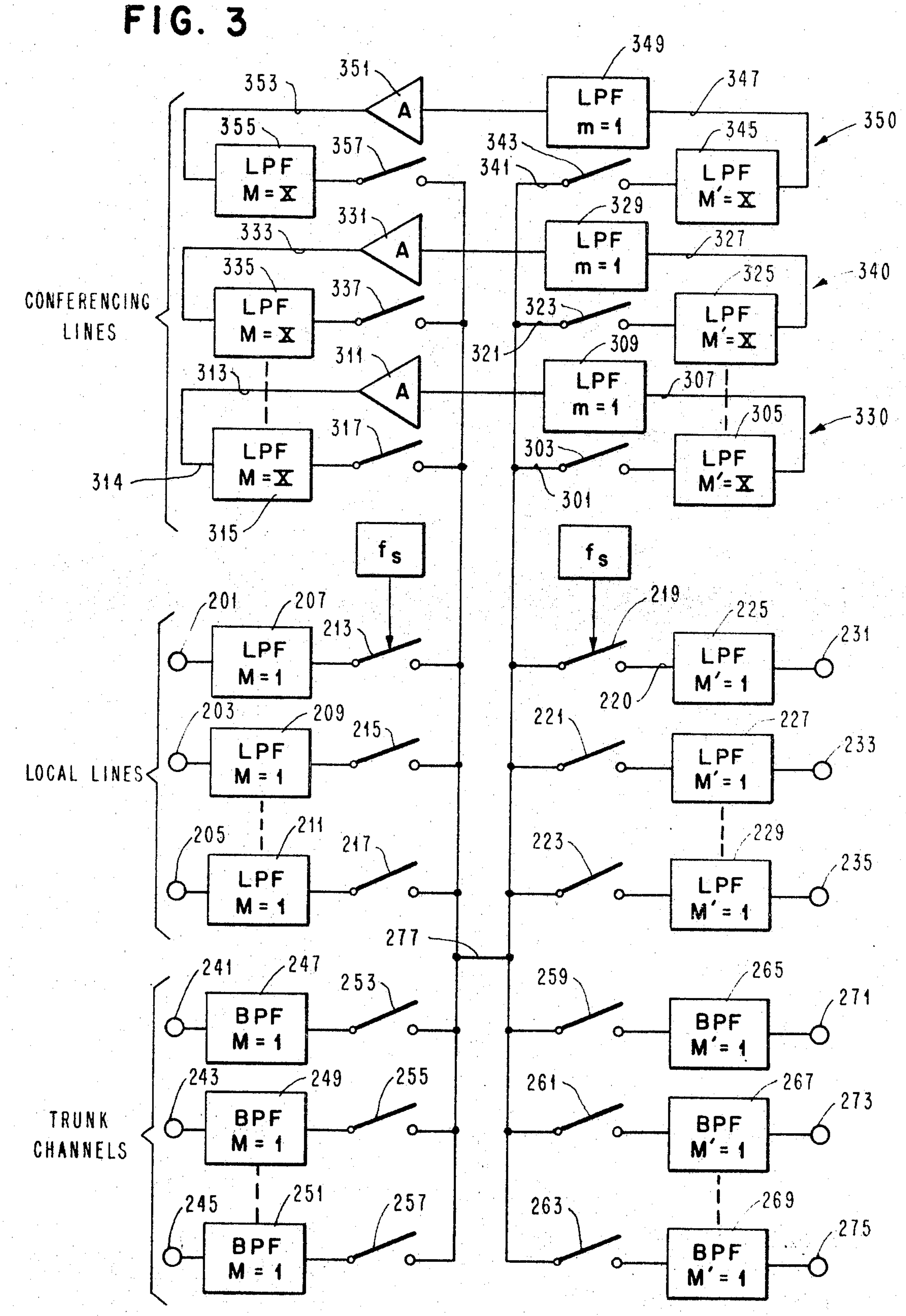
FIG. 3 is a representation of a conferencing communication switching utilizing the insertion technique of FIG. 2.

In FIG. 3 there is seen a conferencing system according to the invention. The local lines and trunk channel are identical to those of the integrated time division switching and frequency division multiplexing communications system described in FIG. 2, and will not be described further here. The conferencing capability of the system exists by virtue of the conferencing lines. Each conferencing line comprises three low pass filters, an amplifier, and two sampling switches. For example, conferencing line 330 comprises input line 301, resonant transfer sampling switch 303, low pass filter 305, low pass filter 309, and amplifier 311, low pass filter 315, and sampling switch 317. Since all filters are low pass, the value of $n$ for each filter is 1. The value of $m$ for filter 309 is 1 and the value of $m$ for filter 305 and 315 is X, where X is the number of time slots. Likewise, conferencing line 340 comprises input line 321, sampling switch 323, low pass filter 325, low pass filter 329, amplifier 331, low pass filter 335, and sampling switch 337. Conferencing line 350 is comprised similarly. The conferencing lines are connected into the system at the sampling switches. For example, sampling switches 317, 337 and 357 are connected to the input side of time divided highway 277. The conferencing input and output filters 305, 325, 345 and 314, 335, 355, respectively, are wideband since $M=M'=X$ where, as before, X is the number of time slots. Therefore, the bandwidth of these filters is X times as wide as the line and channel filters for which $M=M'=1$.

OPERATION OF FIG. 3

A conferencing connection may be set up by time division multiplexing the input side of the lines or channels to be included in the conference into one conferencing wideband low pass filter on the output side of the system. For example, assume that local lines 201, 203, and 205 are to be connected in a conference with outgoing trunk channels 271, 273, 275. Assume conferencing circuit 330 will be used for the conference connection. The signals from the talkers in lines 201, 203, 205 pass through their respective low pass filters 207, 209, 211 and are sampled in a given sequence by switches 213, 215, 217 at a rate $f_s$. The signal from each switch is combined into a time multiplexed signal over time divided highway 277 and multiplexed into conferencing wideband filter 305 via sampling switch 303 over line 301. The minimum multiplexing interval would be $1/Xf_s$, or, stated another way, the maximum multiplexing rate would be $Xf_s$. Sampling switch 303 is operated at a rate $1/Xf_s$. According to well known resonant transfer theory, as explained in detail in copending application Ser. No. 591,396, the impulse response at the input to filter 305 is such that it is passing through zero at the end of the multiplexing interval $1/Xf_s$, at which point another input line or channel is multiplexed in. That is to say, a sample from line 201 is sampled by switch 213 which closes simultaneously with switch 303. Thus, the first sample is fed to conferencing wideband filter 305. Then, $1/Xf_s$ seconds after switch 213 closed, switch 215 closes to sample an input from line 203. Switch 303 closes concurrently with switch 215. Due to the above explained impulse response characteristic, the ringoff from the first sample into low pass filter 305 is passing through zero $1/Xf_s$ seconds after switch 213 has opened so that the sample via switch 215 can now be inserted into filter 305. This process continues for all conferees in the connection. Having multiplexed the several lines or channels to be included into wideband filter 305, the next step is to apply this signal to low pass filter 309 which has $m$ equal to 1 so that its bandwidth is $f_s/2$. Followering this filter is an amplifier 311 required to make up certain losses which will be discussed subsequently. The baseband signal emerging from the amplifier is applied to the input wideband filter 315 from which point it is time multiplexed out to the output filters of the lines or channels in the conference say, for instance, 235, 271, 273. This multiplexing from filter 315 via switch 317 to the output lines and channels in the conference is similar to the distribution method of the signalling insertion technique illustrated relative to FIG. 2, above. In this case, the wideband filter 315 is $Xf_s/2$ in bandwidth since it is required to feed output lines or channels that can have a minimum separation in time of $1/Xf_s$. From the above explanation it can be seen that it is necessary to match the closure of the switches on the input sides of the lines or channels in the conference (e.g. 213, 215, 217 in this illustration) to the time slots assigned to the particular conferencing wideband filter (305), and then further necessary to match the closure of the switch (317) at the output of the wideband filter (315) on the input side to the time slots assigned to the output sides of the lines or channels in the conference (235, 271, 273 in this example). This process may be carried out simultaneously with regard to other groups of lines or channels that may desire to be connected in another conference, by using another conference circuit such as 340 or 350.

Figure 4A:
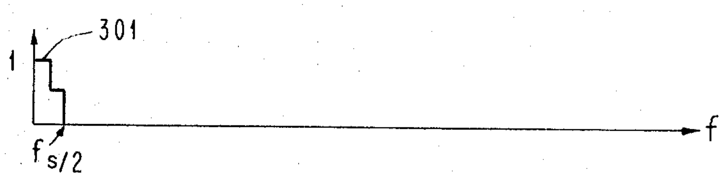
FIGS. 4A–4E represent spectral information for the conferencing system of FIG. 3.
Figure 4B:
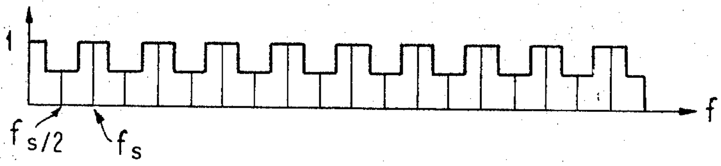
Figure 4C:
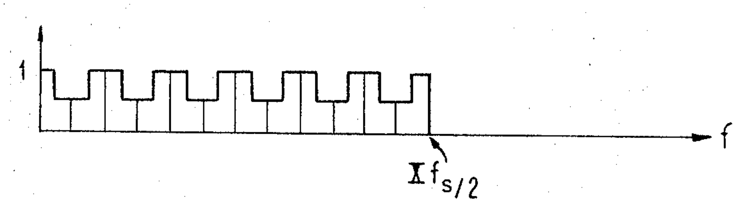
Figure 4D:
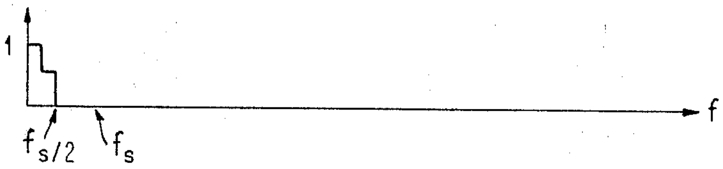
Figure 4E:
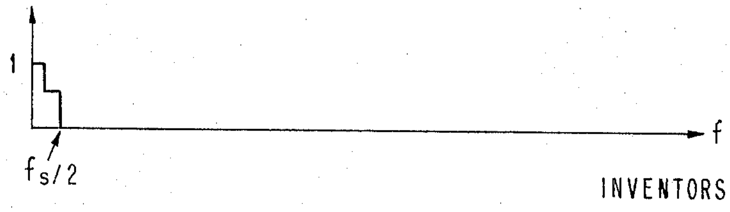

To complete the explanation, the representation of spectral information seen in FIGS. 4A–4E should be considered, for a more clear understanding of power distribution within the system. These figures show certain amplitude spectral data connected with the conferencing scheme. In these figures a voice signal from one of the several input lines, for instance line 201, is shown as it progresses through the system from input to output. With reference to FIG. 4A, there is shown an assumed spectral representation 301 for the continuous input signal over line 201, for example. This representation extends from zero to $f_s/2$ c.p.s., or 4 kcs. for the present illustration. After passing to the input low pass filter 207 and being sampled by switch 213, the spectrum becomes a series of upper and lower sidebands extending along the frequency axis, each sideband covering $f_s/2$ c.p.s. This is seen in FIG. 4B. As shown in FIG. 4B, all sidebands are shown to be of equal amplitude, which is approximately true since the sampling width $\tau$ is assumed to be very small in comparison with the sampling period $T=1/f_s$. Equal energy would be contained in each sideband. If this signal were to exit into one of the line or channel filters 225, 227, 229, 265, 267, 269, with the circuit incorporating lossless resonant transfer, then the baseband would be recovered and would contain all the energy that is spread out into the many basebands of FIG. 4B. However, for the present conferencing case, the signal represented in FIG. 4B fits into the wideband conferencing filter 305 via switch 303, so that the total output energy instead of being concentrated in a baseband, is concentrated in several sidebands as defined by the width of filter 305. This is seen in FIG. 4C. Since the width of low pass wideband filter 305 is $Xf_s/2$, it passes the sidebands from zero to $Xf_s/2$. Note that the baseband, 301 in FIG. 4A, can also be considered as an upper sideband centered about zero frequency. After exiting from filter 305, the spectrum seen in FIG. 4C is applied to the low pass filter 309 in the conferencing circuit. At this point all sidebands except the baseband are eliminated. This is seen in FIG. 4D. The energy of this baseband signal emerging from filter 309 is $1/X$ of that contained in the wideband signal of FIG. 4C. The amplifier following this filter is included to make up for this difference, and also for the normal 3 db loss due to the insertion of the additional resonant transfer stage itself. Note that this loss is not due to the resonant transfer phenomena, but is due to the normal inherent circuit power loss. It can be shown that the technique of resonant transfer ideally transfers the total available power from an input filter to an output filter.

The amplified baseband signal shown in FIG. 4D is then applied to conferencing wideband filter 315. Also, upon leaving this filter it is distributed to the several output lines or channels that would be included in the conferencing connection. This final offset distribution state would be just as for the case of the signalling insertion technique described above with reference to FIG. 2. The final baseband signal appearing at any output, that is, at the input to any switch 219, 221, 223, 259, 261, 263, would be as shown in 4E. Thus, it is evident that this one voice signal entering from an input line such as 201 would be sent to all output lines or channels participating in the conference. The other input lines or channels that would be included in the conference would all have been time multiplexed into the conferencing wideband filter 305 and processed in a manner just like that described for the one voice signal in line 201. Each of these signals would be distributed to all output lines or channels forming part of the conference, thus completing the conferencing circuit.

To see more specifically how the power distributes, note that the RMS baseband power drawn from one source would be $$\frac{\left|\frac{E_G(j\omega)}{2}\right|^2}{R_L}$$

All of this power appears evenly distributed in the various sidebands, as in FIG. 4C, at the output 306 of the conferencing wideband filter 305. Therefore, the power in any one sideband would be $$\frac{\left|\frac{E_G(j\omega)}{2}\right|^2}{XR_L}$$

Since this power is developed across an impedance level of $R_L/X$, the voltage of the baseband would be $$\frac{\left|\frac{E_G(j\omega)}{2}\right|^2}{XR_L}=\frac{|E_{BB}(j\omega)|^2}{R_{L/X}}$$

where:

$E_{BB}(j\omega)$ is the baseband voltage $$E_{BB}(j\omega)=\frac{E_G(j\omega)}{2}\frac{1}{X}$$

It would be this baseband signal which would exit from the lowpass filter 309 and then be applied to the amplifier 311. This amplifier would amplify by a factor of $2x$, thus restoring the baseband signal to its original voltage level. After application of this signal to the input 314 of the conferencing filter 315 and the multiplexing of the output of this filter to the various line or channel output output filters, the output power across any of the $R_L$'s would be $$\frac{\left|\frac{E_G(j\omega)}{2}\right|^2}{R_L}$$

Thus, any one source would deliver the same power to each line or channel load via the conferencing circuit, that it would deliver if it were directly multiplexed to this line or channel output.

Thus, has been shown a method for inserting a signal into an operating integrated time division switching and frequency division multiplexing system, and the employment of this signal insertion scheme in a conferencing system.

A further comment is in order regarding the use of these schemes for conventional time division switching networks. Conventional networks differ in that the bandpass trunk channel input and output filters such as seen in FIG. 2 are replaced by low pass filters, and the trunk channel inputs and outputs are each separate. That is, instead of one frequency multiplexed signal emerging from the output side, a group of separate baseband channels emerge which must be frequency multiplexed by separate equipment. The inverse of this applies to the input side. Thus the conventional time division switch has a basic transmission path from baseband to baseband filter via a switch, which is just a special case of the more general integrated time division switching and frequency division multiplexing communication system disclosed herein. Because of this, all features of this signal and tone injection technique, and of the conferencing technique are equally applicable to the conventional case. The local line to local line portion of the disclosed system would be comparable to the conventional situation.

While the invention has been particularly shown and described with reference to a preferred embodiment thereof, it will be understood by those skilled in the art that the foregoing and other changes in form and detail may be made therein without departing from the spirit and scope of the invention.

We claim:

1. In a resonant transfer time division switching and frequency division multiplexing system, the combination of:

a group of input local lines and trunk channels, each including a filter, each filter having a bandwidth and a passband, said passband having a high edge and a low edge, for receiving signals within said passband;

a group of output local lines and trunk channels, each including a filter, each filter having a bandwidth and a passband, said passband having a high edge and a low edge, for receiving signals within said passband;

a time divided highway having an input and an output;

a first plurality of switch means connected between said group of local lines and trunk channels and said input of said time divided highway;

a second plurality of switch means connected between said output of said time divided highway and said group of output local lines and trunk channels;

supervisory signal insertion means including a wideband filter having a given bandwidth, and a frequency passband, said passband having a high edge and a low edge, for receiving a supervisory signal within said passband, and further including switch means connected between said wideband filter and said input of said time divided highway;

each of said first plurality of switch means and said second plurality of switch means selectively closable on a time multiplex basis at a sampling rate $f_s$; and said switch means closable at a sampling rate $Xf_s$, where X is the total number of said output local lines and trunk channels, for inserting said supervisory signal into any of said output local lines or trunk channels.

2. The combination of claim 1 wherein said bandwidth and said high edge of said passband for said wideband filter and said included filter in any of said output local lines or trunk channels is such that said bandwidth is equal to $mf_s/2$ and said high edge of said passband is equal to $nmf_s/2$, where $n$ and $m$ are integral positive numbers.

3. The combination of claim 2 wherein said supervisory signal comprises a single frequency tone.

4. In a resonant transfer switching system the combination of:

a plurality of input local lines and trunk channels, each including a filter of given bandwidth and frequency passband, for receiving signals from any of a first group of conferees;

a plurality of output local lines and trunk channels, each including a filter of given bandwidth and frequency passband, for receiving signals to be transmitted to any of a second group of conferees;

signal insertion means including a first wideband filter of given bandwidth and frequency passband;

signal receiving means including a second wideband filter of given bandwidth and frequency passband;

multiplexing means, including a time divided highway, said multiplexing means connected between said plurality of input local lines and trunk channels and said signal insertion means on a first side, and between said plurality of output local lines and trunk channels and said signal receiving means on a second side;

said multiplexing means for selectively time multiplexing signals from any number of said plurality of input local lines and trunk channels into said signal reception means and for selectively time multiplexing signals from said signal insertion means into any number of said plurality of output local lines and trunk channels; and a conducting path connecting said second wideband filter to said first wideband filter, said conducting path including narrow band filter means for selectively receiving time multiplexed signals from said second wideband filter for transmission to said first wideband filter.

5. The combination of claim 4 including a plurality of said signal insertion means and said signal reception means, each respective member of said plurality connected by a conducting path including narrow band filter means.

6. The combination of claim 4 wherein said conducting path further includes amplification means.

7. The combination of claim 4 wherein said multiplexing means includes a group of switches each selectively closable at a sampling rate $f_s$.

8. The combination of claim 5 wherein said frequency passband of each filter has a high edge and a low edge such that for each respective filter, said bandwidth is equal to $mf_s/2$ and said high edge of said frequency passband is equal to $nmf_s/2$, wherein $n$ and $m$ are positive integral numbers and $f_s$ is the rate at which said multiplexing means time multiplexes signals from each of any number of said plurality of input local lines and trunk channels into said signal reception means and where $f_s$ is also the rate at which said multiplexing means time multiplexes signals from said signal insertion means into any number of said plurality of output local lines and trunk channels.

References Cited

UNITED STATES PATENTS

| | | | |
|---|---|---|---|
| 3,118,019 | 1/1964 | Feder | 179—15 |
| 3,188,393 | 6/1965 | Jacob | 179—15 |
| 3,399,278 | 8/1968 | Dahlman | 179—15 |
| 3,412,208 | 11/1968 | Jacob | 179—15 |

RALPH D. BLAKESLEE, Primary Examiner